United States Patent
Lin

(10) Patent No.: US 12,466,395 B2
(45) Date of Patent: Nov. 11, 2025

(54) METHOD FOR IDENTIFYING FALSE RISK WARNING IN INTER-VEHICLE NETWORK AND VEHICLE-MOUNTED ELECTRONIC DEVICE USING THE SAME

(71) Applicant: WISTRON CORPORATION, New Taipei (TW)

(72) Inventor: Chao Sheng Lin, New Taipei (TW)

(73) Assignee: WISTRON CORPORATION, New Taipei (TW)

(*) Notice: Subject to any disclaimer, the term of this patent is extended or adjusted under 35 U.S.C. 154(b) by 60 days.

(21) Appl. No.: 18/609,406

(22) Filed: Mar. 19, 2024

(65) Prior Publication Data

US 2025/0222922 A1    Jul. 10, 2025

(30) Foreign Application Priority Data

Jan. 9, 2024  (TW) .................................. 113100963

(51) Int. Cl.
| | | |
|---|---|---|
| *G08G 1/16* | (2006.01) | |
| *B60W 30/08* | (2012.01) | |
| *B60W 50/14* | (2020.01) | |

(52) U.S. Cl.
CPC ............ *B60W 30/08* (2013.01); *B60W 50/14* (2013.01); *G08G 1/162* (2013.01); *G08G 1/167* (2013.01)

(58) Field of Classification Search
USPC .... 340/903, 905–907, 908.1, 916, 931, 980, 340/994, 995.1, 426.15, 426.26, 438
See application file for complete search history.

(56) References Cited

U.S. PATENT DOCUMENTS

| | | | |
|---|---|---|---|
| 2013/0238282 A1* | 9/2013 | Figueroa-Karlstrom | B64D 15/20 702/170 |
| 2016/0304028 A1* | 10/2016 | Hathaway | G01S 13/931 |

(Continued)

FOREIGN PATENT DOCUMENTS

| | | |
|---|---|---|
| CN | 108400973 A | 8/2018 |
| CN | 113420805 A | 9/2021 |

(Continued)

OTHER PUBLICATIONS

Extended European Search Report of European patent application No. 24165539.8 dated Sep. 10, 2024, 10 pages.

(Continued)

*Primary Examiner* — Daniel Previl
(74) *Attorney, Agent, or Firm* — Brooks Kushman P.C.

(57) ABSTRACT

A method of identifying a false risk warning for an inter-vehicle network includes: in response to obtaining a first risk warning based on the inter-vehicle network, determining whether a second risk warning corresponding to the first risk warning based on an object detection operation is obtained; in response to determining that the second risk warning is obtained, determining that the first risk warning is trustworthy; in response to determining that the second risk warning is not obtained, determining whether the first risk warning is trustworthy based on the object detection operation; in response to determining that the first risk warning is trustworthy, adjusting a driving behavior according to the first risk warning or the second risk warning; and ignoring the first risk warning in response to determining that the first risk warning is not trustworthy.

20 Claims, 8 Drawing Sheets

(56) References Cited

U.S. PATENT DOCUMENTS

| | | | | |
|---|---|---|---|---|
| 2017/0308265 A1* | 10/2017 | Kim | ...................... | B60K 35/211 |
| 2019/0337533 A1* | 11/2019 | Kume | ................ | B60W 30/0956 |
| 2020/0137580 A1* | 4/2020 | Yang | ................... | H04W 12/122 |
| 2020/0364618 A1* | 11/2020 | Peh | ...................... | G06Q 10/0635 |
| 2021/0183228 A1* | 6/2021 | Yun | ......................... | E05B 81/56 |
| 2021/0362750 A1* | 11/2021 | Yang | ..................... | B60W 40/08 |
| 2022/0289176 A1* | 9/2022 | Baek | ..................... | B60W 30/09 |
| 2023/0326321 A1* | 10/2023 | Shao | ...................... | G08B 31/00 |
| | | | | 340/602 |
| 2023/0347876 A1* | 11/2023 | Quint | .................... | B60W 30/14 |

FOREIGN PATENT DOCUMENTS

| | | | |
|---|---|---|---|
| CN | 116311157 A | 6/2023 | |
| CN | 117037115 A | 11/2023 | |

OTHER PUBLICATIONS

Tiffany Hyun-Jin Kim et al., "Vanet alert endorsement using multi-source filters", Vehicular Internetworking, ACM, 2 Penn Plaza, Suite 701 New York NY 10121-0701 USA, Sep. 24, 2010 (Sep. 24, 2010), pp. 51-60, XP058312394, DOI: 10.1145/1860058.1860067 ISBN: 978-1-4503-0145-9.

\* cited by examiner

METHOD FOR IDENTIFYING FALSE RISK WARNING IN INTER-VEHICLE NETWORK AND VEHICLE-MOUNTED ELECTRONIC DEVICE USING THE SAME

CROSS-REFERENCE TO RELATED APPLICATION

This application claims the priority and benefit of Taiwan Patent Application No. 113100963, filed on Jan. 9, 2024, the disclosure of which is hereby incorporated in its entirety by reference herein.

FIELD OF INVENTION

The disclosure relates to a method for identifying a false risk warning, and particularly relates to a method for identifying a false risk warning in an inter-vehicle network and a vehicle-mounted electronic device using the same.

BACKGROUND

A vehicular ad-hoc network (VANET) may implement V2X (vehicle-to-everything) communication and provide support for intelligent transportation systems. Therefore, importance of network security of the VANET increases day by day. There are many network attacks that may be carried out through V2X, and the most widespread and serious network attack is Sybil attack.

The Sybil attack may create false V2V (vehicle-to-vehicle) information that may be spread through V2X by hackers by locating and modifying vehicle-related information. For example, a set of false inter-vehicle network data that does not exist is fabricated and disseminated in an attempt to influence driving behaviors of vehicles that receive the false inter-vehicle network data and generate risk warning messages.

SUMMARY

An embodiment of the disclosure provides a method for identifying a false risk warning in an inter-vehicle network adapted to a vehicle-mounted electronic device of a vehicle. The vehicle-mounted electronic device includes a processor and a communication circuit unit. The vehicle-mounted electronic device is connected to the inter-vehicle network via the communication circuit unit. The method includes the following steps. An advanced driver assistance system of the vehicle is instructed to perform an object detection operation. In response to obtaining a first risk warning based on the inter-vehicle network, it is determined whether a second risk warning corresponding to the first risk warning based on the object detection operation is obtained. The second risk warning is received from the advanced driver assistance system. In response to determining that the second risk warning corresponding to the first risk warning based on the object detection operation is obtained, it is determined that the first risk warning based on the inter-vehicle network is trustworthy. In response to determining that the second risk warning corresponding to the first risk warning based on the object detection operation is not obtained, it is determined whether the first risk warning based on the inter-vehicle network is trustworthy based on an object detection result of the object detection operation and a plurality of predefined conditions corresponding to the object detection operation. In response to determining that the first risk warning based on the inter-vehicle network is trustworthy, a driving behavior of the vehicle is adjusted according to the first risk warning or the second risk warning. In response to determining that the first risk warning based on the inter-vehicle network is untrustworthy, the first risk warning is ignored, and the driving behavior of the vehicle is not adjusted according to the first risk warning.

Another embodiment of the disclosure further provides a vehicle-mounted electronic device adapted to a vehicle, including a communication circuit unit configured to be connected to an inter-vehicle network, a processor coupled to the communication circuit unit, and a storage circuit unit that stores a plurality of instructions. When being executed by the processor, the plurality of instructions are configured to execute the following: instruct an advanced driver assistance system of the vehicle to perform an object detection operation; in response to obtaining a first risk warning based on the inter-vehicle network, determine whether a second risk warning corresponding to the first risk warning based on the object detection operation is obtained, where the second risk warning is received from the advanced driver assistance system; in response to determining that the second risk warning corresponding to the first risk warning based on the object detection operation is obtained, determine that the first risk warning based on the inter-vehicle network is trustworthy; in response to determining that the second risk warning corresponding to the first risk warning based on the object detection operation is not obtained, determine whether the first risk warning based on the inter-vehicle network is trustworthy based on an object detection result of the object detection operation and a plurality of predefined conditions corresponding to the object detection operation; in response to determining that the first risk warning based on the inter-vehicle network is trustworthy, adjust a driving behavior of the vehicle according to the first risk warning or the second risk warning; and in response to determining that the first risk warning based on the inter-vehicle network is untrustworthy, ignore the first risk warning and does not adjust the driving behavior of the vehicle according to the first risk warning.

Based on the above descriptions, the method for identifying the false risk warning in the inter-vehicle network and the vehicle-mounted electronic device using the method provided by the disclosure may determine whether the first risk warning is trustworthy based on the object detection operation, the first risk warning based on the inter-vehicle network, and the second risk warning based on the object detection operation.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
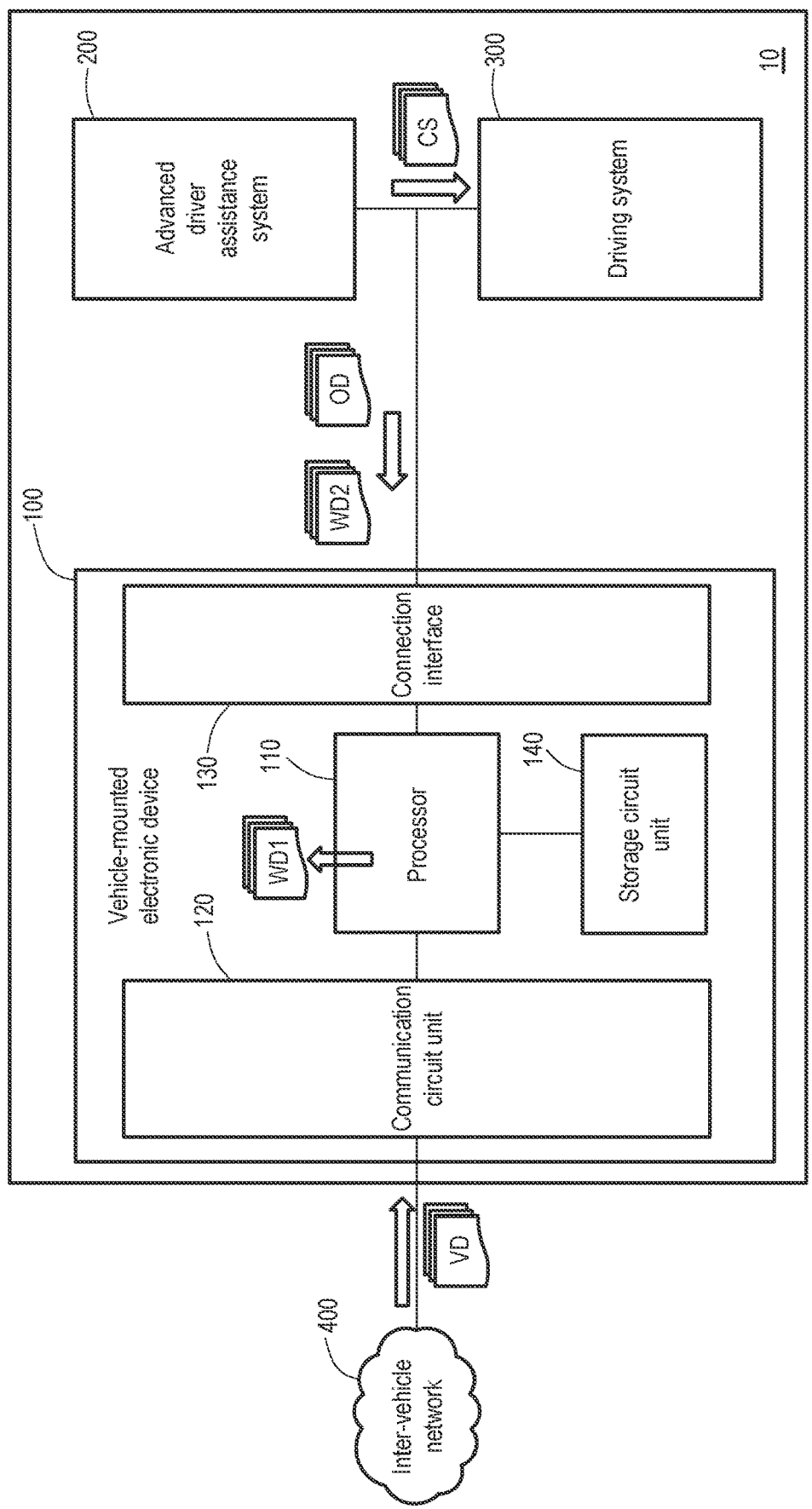
FIG. 1 is a schematic block diagram of a plurality of electronic devices configured on a vehicle according to an embodiment of the disclosure.

Referring to FIG. 1, in this embodiment, a vehicle 10 includes: a vehicle-mounted electronic device 100, an advanced driver assistance system 200, and a driving system 300. The vehicle-mounted electronic device 100 includes a processor 110, a communication circuit unit 120, a connection interface 130, and a storage circuit unit 140. The processor 110 is coupled to the communication circuit unit 120, the connection interface 130, and the storage circuit unit 140. The vehicle-mounted electronic device 100 may also be referred to as an on board unit (OBU).

The advanced driver assistance system 200 includes a plurality of sensors (e.g., cameras, radars, lidars, ultrasonic transceivers, GPS receivers, accelerometers, inertia meters, gyroscopes, etc.) and a logic operation unit (e.g., a processor or a MCU) to plan/assist the driving behavior of the vehicle 10 and provide corresponding information to the vehicle-mounted electronic device 100. The driving system 300 is used to control movement of the vehicle 10. The advanced driver assistance system (ADAS) 200 and the driving system 300 may also be integrated into the vehicle-mounted electronic device 100, so that the vehicle-mounted electronic device 100 may control all operations of the vehicle 10.

The processor 110 is, for example, a microprogrammed control unit (MCU), a central processing unit (CPU), a programmable microprocessor, or an application specific integrated circuit (ASIC), a programmable logic device (PLD) or other similar devices.

The communication circuit unit 120 is coupled to the processor 110 and is used to transmit or receive data through wireless communication. In this embodiment, the communication circuit unit 120 may have a wireless communication circuit module (not shown) and support one or a combination of global system for mobile communication (GSM) system, wireless fidelity (WiFi) system, mobile communication technologies of different generations (e.g., 3G-6G), Bluetooth communication technology, but the disclosure is not limited thereto. The communication circuit unit 120 is configured to be connected to the inter-vehicle network 400 via a vehicle-to-vehicle (V2V) communication protocol and a vehicle-to-everything (V2X) communication protocol. The inter-vehicle network 400 is, for example, a vehicular ad-hoc network (VANET). The processor 110 may receive data related to surrounding vehicles (such as speeds, positions, driving directions, braking, and loss of stability, etc., such as inter-vehicle network data VD shown in FIG. 1) via the inter-vehicle network 400 and execute a predefined application to obtain/generate risk warning information WD1 (which is also referred to as first risk warning WD1), i.e., obtains the first risk warning WD1 based on the inter-vehicle network 400. In an embodiment, the processor 110 may generate the first risk warning WD1 based on the inter-vehicle network 400 according to the received inter-vehicle network data VD. It should be noted that in this embodiment, the processor 110 generates the first risk warning WD1 based on the inter-vehicle network data VD from the inter-vehicle network 400, but the disclosure is not limited thereto. For example, in another embodiment, the processor 110 may also receive the first risk warning WD1 from the inter-vehicle network 400.

When it is determined that the first risk warning WD1 based on the inter-vehicle network 400 is trustworthy, the processor 110 may generate and transmit a corresponding control instruction CS to the driving system 300 to adjust a driving behavior of the vehicle 10. In addition, in another embodiment, when it is determined that the first risk warning WD1 based on the inter-vehicle network 400 is trustworthy, the processor 110 notifies the advanced driver assistance system 200, and the advanced driver assistance system 200 generates and transmits the corresponding control instruction CS to the driving system 300 to adjust the driving behavior of the vehicle 10.

The connection interface 130 is coupled to the processor 110. The processor 110 is used to establish a data connection with the advanced driver assistance system 200 through the connection interface 130 to transmit data with the advanced driver assistance system 200. For example, an object detection result OD and risk warning information WD2 (which is also referred to as a second risk warning) are received from the advanced driver assistance system 200. In an embodiment, the connection interface 130 includes vehicle Ethernet.

In this embodiment, the first risk warning WD1 and second risk warning WD2 include: a forward collision warning (FCW) and a blind spot warning (BSW). However, the disclosure is not limited thereto. For example, the first risk warning WD1 and the second risk warning WD2 may further include other types of risk warnings that may be determined by the processor 100 or the advanced driver assistance system 200 based on the object detection operation or the collected sensing data.

The storage circuit unit 140 is coupled to the processor 110. The storage circuit unit 140 may store data via an instruction of the processor 110. The data includes data from external sources, such as the inter-vehicle network data, as well as internal data and system data. The system data is, for example, software/firmware used to process the inter-vehicle network data from the inter-vehicle network, software/firmware used to process object detection data of the vehicle, etc. The internal data is, for example, object detection data, etc. The storage circuit unit includes any type of hard disk drive (HDD) or non-volatile memory storage device (e.g., SSD). In an embodiment, the storage circuit unit further includes a memory for temporarily storing a plurality of instructions or data executed by the processor, such as a dynamic random access memory (DRAM), a static random access memory (SRAM), etc.

In an embodiment, the vehicle-mounted electronic device 100 further includes an input/output unit, which includes an input device and an output device. The input device is, for example, a microphone, a touch pad, a touch panel, a knob, buttons, etc., which are used to allow a user to input data or control functions that the user wants to operate. The output device is, for example, a monitor, a speaker, etc., which is not limited by the disclosure. In an embodiment, the input/output unit may be a touch screen, a head-up display or a head-mounted display.

Figure 2:
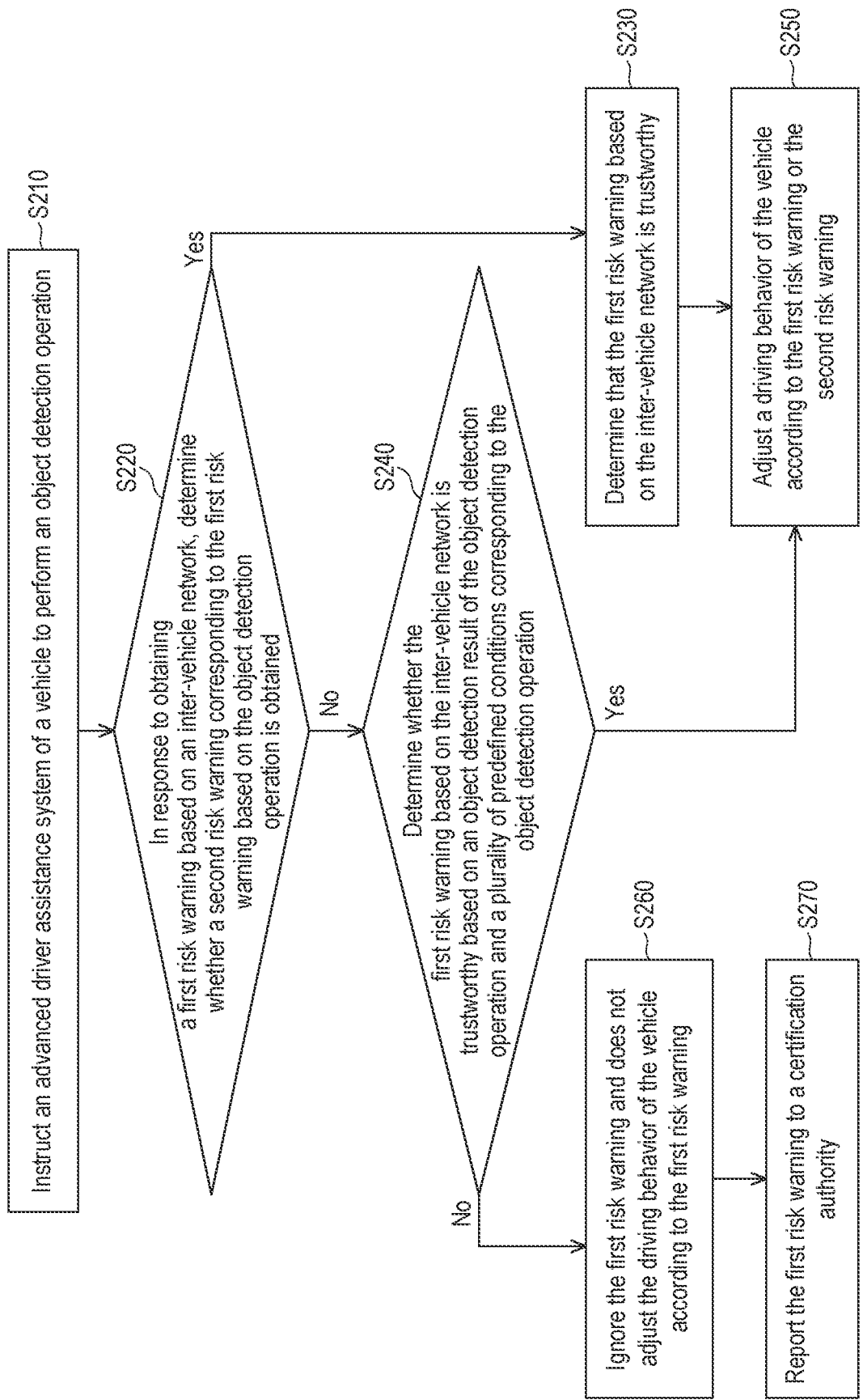
FIG. 2 is an operational flow chart of a method for identifying a false risk warning in an inter-vehicle network according to an embodiment of the disclosure.

Referring to FIG. 2, in step S210, the processor 110 instructs the advanced driver assistance system 200 of the vehicle 10 to perform an object detection operation. In an embodiment, in response to determining that the advanced driver assistance system 200 does not perform the object detection operation, the processor 110 instructs the advanced driver assistance system 200 to perform the object detection operation.

Next, in step S220, in response to obtaining the first risk warning WD1 based on the inter-vehicle network 400, the processor 110 determines whether the second risk warning WD2 corresponding to the first risk warning WD1 based on the object detection operation is obtained, where the second risk warning WD2 is received from the advanced driver assistance system 200. In brief, when the inter-vehicle network data VD is received from the inter-vehicle network 400 and the corresponding first risk warning WD1 is generated (i.e., the first risk warning WD1 based on the inter-vehicle network 400 is obtained), the processor 110 accordingly determines whether to also receive/obtain the corresponding second risk warning WD2 from the advanced driver assistance system 200. In an embodiment, a time difference between obtaining the second risk warning WD2 and obtaining the first risk warning WD1 needs to be less than a predefined time threshold (e.g., 5 seconds or other seconds). The predefined time threshold is defined as, for example, maximum period of time of the forward collision warning (FCW) or the blind spot warning (BSW).

Next, in step S230, in response to determining that the second risk warning WD2 corresponding to the first risk warning WD1 based on the object detection operation is obtained, the processor 110 determines that the first risk warning WD1 based on the inter-vehicle network 400 is trustworthy. Namely, after obtaining the first risk warning WD1, if the processor 110 also determines that the second risk warning WD2 corresponding to the first risk warning WD1 is obtained from the advanced driver assistance system 200 (e.g., the first risk warning WD1 and the second risk warning WD2 both indicate that risks of the same type or direction occur around the vehicle 10), the processor 110 trusts this first risk warning WD1. In other words, since the second risk warning WD2 transmitted by the advanced driver assistance system 200 is determined based on the collected sensing data, it is more difficult to be forged and has higher credibility, the processor 110 uses the second risk warning WD2 to verify the first risk warning WD1 (since the first risk warning WD1 may be a risk warning generated based on false information sent to the vehicle-mounted electronic device 100 via the inter-vehicle network 400).

In more detail, the step of determining whether the second risk warning WD2 corresponding to the first risk warning WD1 based on the object detection operation is obtained includes the following. It is determined whether a type of the first risk warning WD1 is the same as a type of the received second risk warning WD2. The type of the first risk warning or the second risk warning is a forward collision warning (FCW) or a blind spot warning (BSW). In response to determining that the type of the first risk warning WD1 is different from the type of the received second risk warning WD2, it is determined that the second risk warning WD2 corresponding to the first risk warning WD1 based on the object detection operation is not obtained. In response to determining that the type of the first risk warning WD1 is the same as the type of the received second risk warning WD2, it is determined whether a risk object of the first risk warning WD1 corresponds to a risk object of the second risk warning WD2. In response to determining that the risk object of the first risk warning WD1 corresponds to the risk object of the second risk warning WD2, it is determined that the second risk warning WD2 corresponding to the first risk warning WD1 based on the object detection operation is obtained. In response to determining that the risk object of the first risk warning WD1 does not correspond to the risk object of the second risk warning WD2, it is determined that the second risk warning WD2 corresponding to the first risk warning WD1 based on the object detection operation is not obtained.

In brief, in response to obtaining the second risk warning WD2 around a time point when the first risk warning WD1 is obtained, the processor 110 may first determine whether the first risk warning WD1 and the second risk warning WD2 belong to a same type (or a same relative position). The type of the first risk warning or the second risk warning is a forward collision warning (FCW) or a blind spot warning (BSW). If yes, it is further determined whether an object of the first risk warning WD1 is similar or identical to an object of the second risk warning WD2. If yes, the processor 110 determines that the obtained second risk warning WD2 corresponds to the first risk warning WD1. If one of the above determinations is a negative result, the processor 110 may determine that the second risk warning WD2 corresponding to the first risk warning WD1 is not obtained.

Next, in step S240, in response to determining that the second risk warning WD2 corresponding to the first risk warning WD1 based on the object detection operation is not obtained, it is determined whether the first risk warning WD1 based on the inter-vehicle network 400 is trustworthy based on an object detection result of the object detection operation and a plurality of predefined conditions corresponding to the object detection operation. In this embodiment, the object detection operation includes one or more of the following operations: a first object detection operation based on image data; a second object detection operation based on point cloud data; and a third object detection operation based on mixed data. The mixed data includes the image data and the point cloud data. In another embodiment, the mixed data is fusion data generated by the image data and the point cloud data.

The first object detection operation based on the image data (or pixel array) is good at determining an area of a first object, but is not good at determining a relative distance between the first object and the vehicle. Comparatively, the second object detection operation based on the point cloud data is less good at determining an area of a second object, but is good at determining a relative distance between the second object and the vehicle. On the other hand, the third object detection operation based on the mixed data has good reliability in determining an area of a third object and a relative distance of the third object, but it requires additional sensing data and calculation resources to process a fusion operation of the image data and the point cloud data.

In more detail, the processor 110 may first identify a type of the object detection operation, and use different predefined conditions to analyze the corresponding object detection results according to different types of object detection operations, so as to determine whether the first risk warning WD1 based on the inter-vehicle network 400 is trustworthy. In other words, since the advanced driver assistance system 200 obtains the object detection result based on the collected sensing data, the object detection result is more difficult to forge and has higher credibility. The processor 110 may also perform analysis by using the received object detection result and corresponding predefined conditions to determine whether the received object detection result has objects corresponding to the first risk warning WD1, and accordingly verify the first risk warning WD1 (since the first risk warning WD1 may be a risk warning generated based on false information sent to the vehicle-mounted electronic device 100 via the workshop network 400).

Next, in step S250, in response to determining that the first risk warning WD1 based on the inter-vehicle network 400 is trustworthy, the processor 110 adjusts the driving behavior of the vehicle according to the first risk warning WD1 or the second risk warning WD2.

Specifically, in an embodiment, after determining that the first risk warning information WD1 is trustworthy according to the second risk warning information WD2 corresponding to the first risk warning information WD1, the processor 110 notifies the advanced driver assistance system 200 that the first risk warning WD1 is trustworthy, and the advanced driver assistance system 200 may generate a corresponding control instruction CS based on the second risk warning WD2, and send the generated control instruction CS to the driving system 300 to adjust a driving behavior of the vehicle. For example, it is assumed that the first risk warning WD1 and the second risk warning WD2 are forward collision warnings, the generated control instruction CS is used to instruct the driving system 300 to perform a braking action, reduce a driving speed, or change lanes, so as to avoid a possible risk event corresponding to the first risk warning WD1 and the second risk warning WD2 by adjusting the driving behavior of the vehicle 10.

In another embodiment, after determining that the first risk warning information WD1 is trustworthy, the processor 110 may also generate the corresponding control instruction CS based on the first risk warning WD1, and send the generated control instruction CS to the driving system 300 to adjust the driving behavior of the vehicle. For example, it is assumed that the trustworthy first risk warning WD1 is a forward collision warning, the control instruction CS is used to instruct the driving system 300 to perform a braking action, reduce the driving speed, or change lanes, so as to avoid a possible risk event corresponding to the first risk warning WD1 by adjusting the driving behavior of the vehicle 10.

Relatively, in step S260, in response to determining that the first risk warning WD1 based on the inter-vehicle network 400 is untrustworthy, the processor 110 ignores the first risk warning WD1 and does not adjust the driving behavior of the vehicle 10 according to the first risk warning WD1. Then, in step S270, the processor 110 reports the first risk warning WD1 to a certification authority (e.g., a certification authority TA shown in FIG. 5A) via the inter-vehicle network 400. For example, in an embodiment, the processor 110 may report the inter-vehicle data that results in generation of the untrustworthy risk warning and/or the untrustworthy risk warning to the certification authority TA, and the certification authority TA may record the data and a source thereof for further monitoring or listing.

Other process details are described in detail below with reference of FIG. 3 and FIG. 4A to FIG. 4C.

Figure 3:
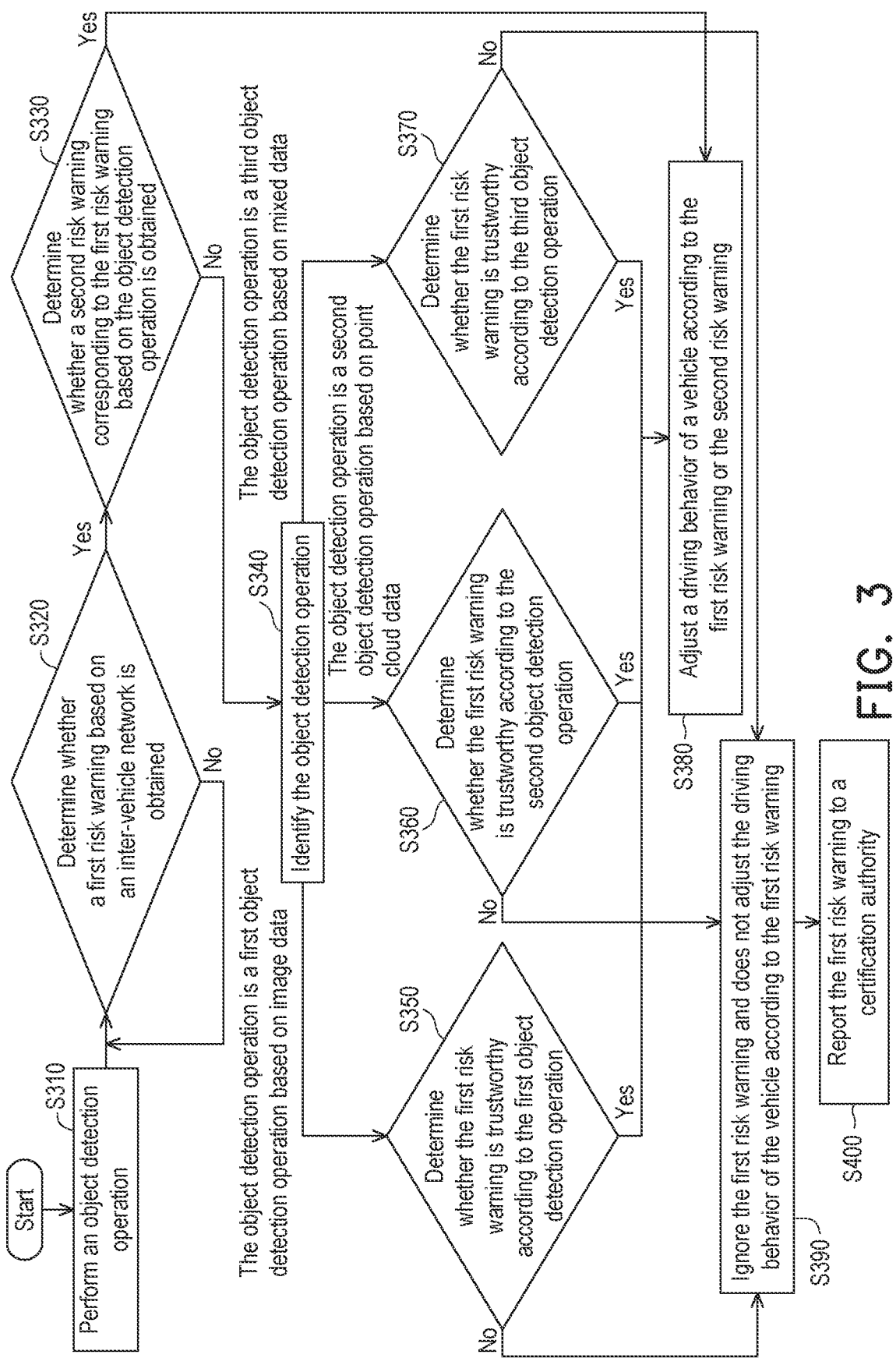
FIG. 3 is another operational flow chart of a method for identifying a false risk warning in an inter-vehicle network according to an embodiment of the disclosure.

Referring to FIG. 3, the advanced driver assistance system 200 performs an object detection operation (S310). Next, the processor 110 determines whether the first risk warning WD1 based on the inter-vehicle network 400 is obtained (S320). If yes, the processor 110 then determines whether the second risk warning WD2 corresponding to the first risk warning WD1 based on the object detection operation is obtained (S330). If yes, the processor 110 adjusts the driving behavior of the vehicle 10 according to the first risk warning WD1 or the second risk warning WD2 (S380). If no, the processor 110 further identifies a type of the object detection operation (S340). The processor 110 may obtain and identify a result of the executed object detection operation and related information (e.g., an object detection result, the type of the object detection operation) from the advanced driver assistance system 200.

According to different types of object detection operations, the processor 110 may adopt different analysis and determination methods to determine whether the first risk warning WD1 is trustworthy. Specifically, when the object detection operation is the first object detection operation based on image data, the processor 110 executes step S350, when the object detection operation is the second object detection operation based on point cloud data, the processor 110 executes step S360, and when the object detection operation is the third object detection operation based on mixed data, the processor 110 executes step S370.

Figure 4A:
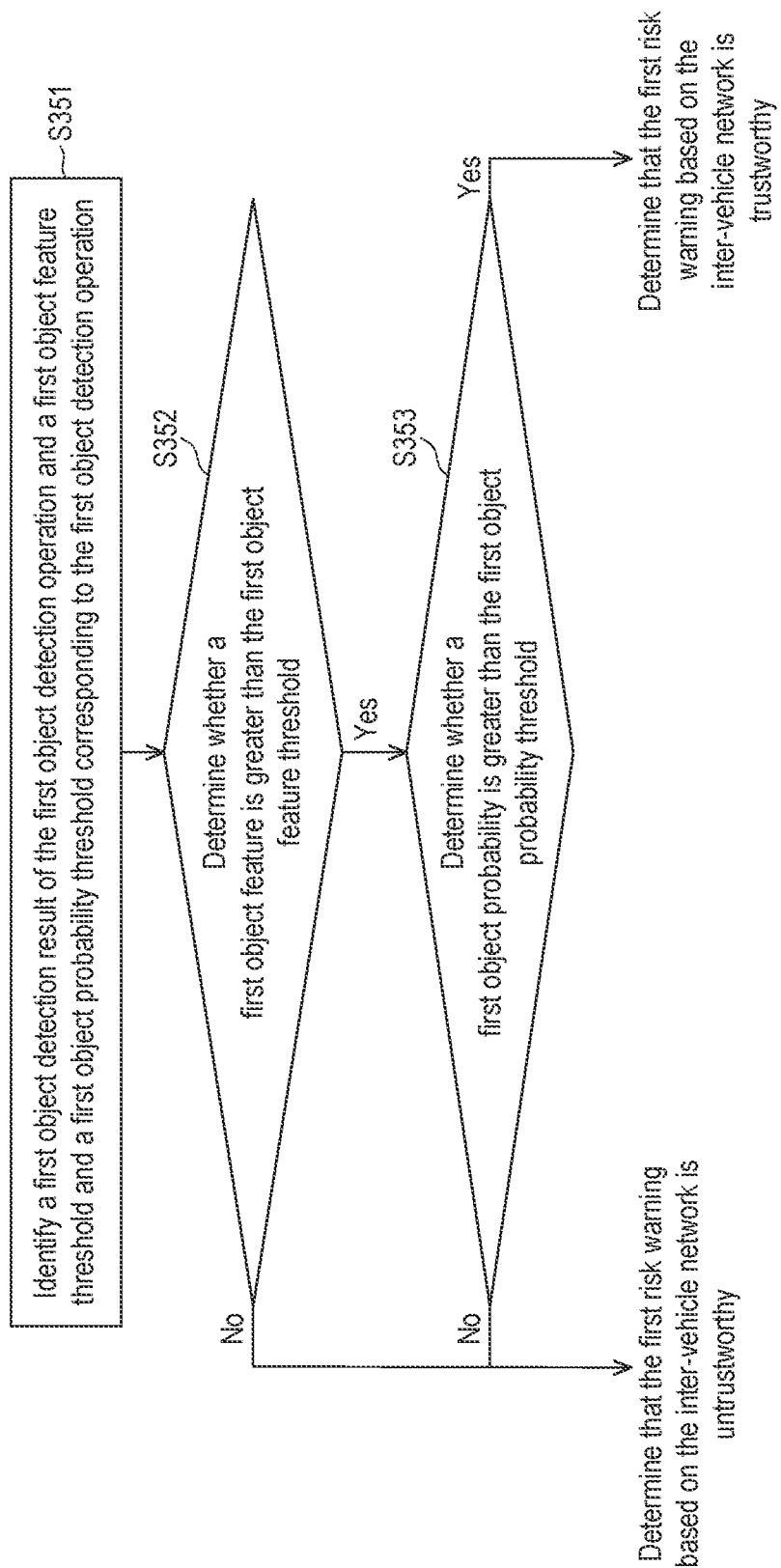
FIG. 4A is a flow chart of step S350 of FIG. 3 according to an embodiment of the disclosure.

In more detail, referring to FIG. 4A, when the object detection operation is the first object detection operation based on image data, the step of determining whether the first risk warning WD1 based on the inter-vehicle network 400 is trustworthy according to the object detection result of the object detection operation and the plurality of predefined conditions corresponding to the object detection operation includes steps S351 to S353.

In step S351, the processor 110 identifies a first object detection result of the first object detection operation and a first object feature threshold and a first object probability threshold corresponding to the first object detection operation. The first object detection result includes a detected first object and a first object feature and a first object probability corresponding to the detected first object, where the first object feature threshold and the first object probability threshold are a plurality of first predefined conditions corresponding to the first object detection operation.

In this embodiment, when the advanced driver assistance system 200 initiates the second risk warning WD2 by executing the first object detection operation, the processor 110 may record an object feature value and an object probability value of a target object corresponding to the second risk warning WD2 at that time. Then, the recorded historical data is used to train the first object feature threshold and the first object probability threshold, or the first object feature threshold and the first object probability threshold are calculated through statistics (such as calculating an average or a median). The obtained first object feature threshold and first object probability threshold may be set as the plurality of first predefined conditions corresponding to the first object detection operation. In addition, in an embodiment, different vehicle speeds may be matched to different first object feature thresholds and first object probability thresholds.

Referring back to FIG. 4A, in step S352, the processor 110 determines whether the first object feature is greater than the first object feature threshold.

Next, in step S353, the processor 110 determines whether the first object probability is greater than the first object probability threshold.

In response to determining that the first object feature is greater than the first object feature threshold ("yes" is determined in S352) and the first object probability is greater than the first object probability threshold ("yes" is determined in S353), the processor 110 determines that the first risk warning WD1 based on the inter-vehicle network 400 is trustworthy.

In contrast, in response to determining that the first object feature is not greater than the first object feature threshold ("no" is determined in S352) or the first object probability is not greater than the first object probability threshold ("no" is determined in S353), the processor 110 determines that the first risk warning WD1 based on the inter-vehicle network 400 is untrustworthy.

It should be noted that in another embodiment, an execution order of steps S352 and S353 may be reversed (i.e., step S353 is executed first, and then step S352 is executed). In addition, in this embodiment, the first object feature includes an image feature size or an image feature ratio of the detected first object, where the image feature ratio of the detected first object is a ratio of the image feature size of the detected first object to a predefined image size of the image data, where the first object probability is an existence probability of the detected first object.

The image feature size is, for example, an image area size covered by a bounding box marking the detected first object. The image area size may be compared with an area size (i.e., the predefined image size) of an image captured by the advanced driver assistance system 200 on the environment of vehicle 10 to obtain a ratio, i.e., the image feature ratio.

Figure 4B:
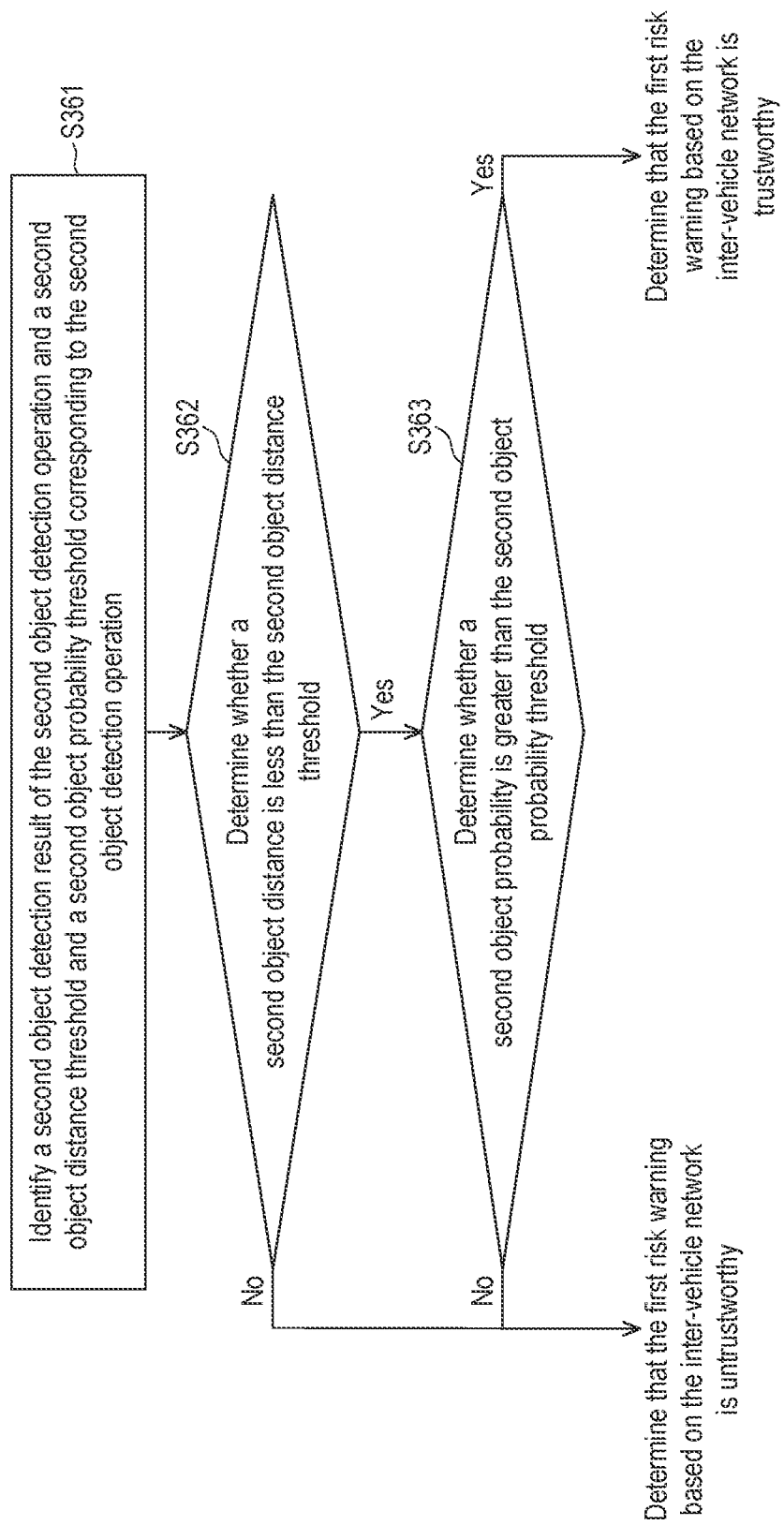
FIG. 4B is a flow chart of step S360 of FIG. 3 according to an embodiment of the disclosure.

On the other hand, referring to FIG. 4B, when the object detection operation is the second object detection operation based on point cloud data, the step of determining whether the first risk warning WD1 based on the inter-vehicle network 400 is trustworthy according to the object detection result of the object detection operation and the plurality of predefined conditions corresponding to the object detection operation includes steps S361 to S363.

In step S361, the processor 110 identifies a second object detection result of the second object detection operation and a second object distance threshold and a second object probability threshold corresponding to the second object detection operation. The second object detection result includes a detected second object and a second object distance and a second object probability corresponding to the detected second object, where the second object distance threshold and the second object probability threshold are a plurality of second predefined conditions corresponding to the second object detection operation.

In this embodiment, when the advanced driver assistance system 200 initiates the second risk warning WD2 by executing the second object detection operation, the processor 110 may record an object distance value and an object probability value of a target object corresponding to the second risk warning WD2 at that time. Then the recorded historical data is used to train the second object distance threshold and the second object probability threshold, or the second object distance threshold and the second object probability threshold are calculated through statistics.

Next, in step S362, the processor 110 determines whether the second object distance is less than the second object distance threshold.

Next, in step S363, the processor 110 determines whether the second object probability is greater than the second object probability threshold.

In response to determining that the second object distance is less than the second object distance threshold ("yes" is determined in S362) and the second object probability is greater than the second object probability threshold ("yes" is determined in S363), the processor 110 determines that the first risk warning WD1 based on the inter-vehicle network 400 is trustworthy.

In response to determining that the second object distance is not less than the second object distance threshold ("no" is determined in S362) or the second object probability is not greater than the second object probability threshold ("no" is determined in S363), the processor 110 determines that the first risk warning WD1 based on the inter-vehicle network 400 is untrustworthy.

It should be noted that in another embodiment, an execution order of steps S362 and S363 may be reversed. In addition, in this embodiment, the second object distance is a distance between the detected second object and the vehicle 10, where the second object probability is an existence probability of the detected second object.

Figure 4C:
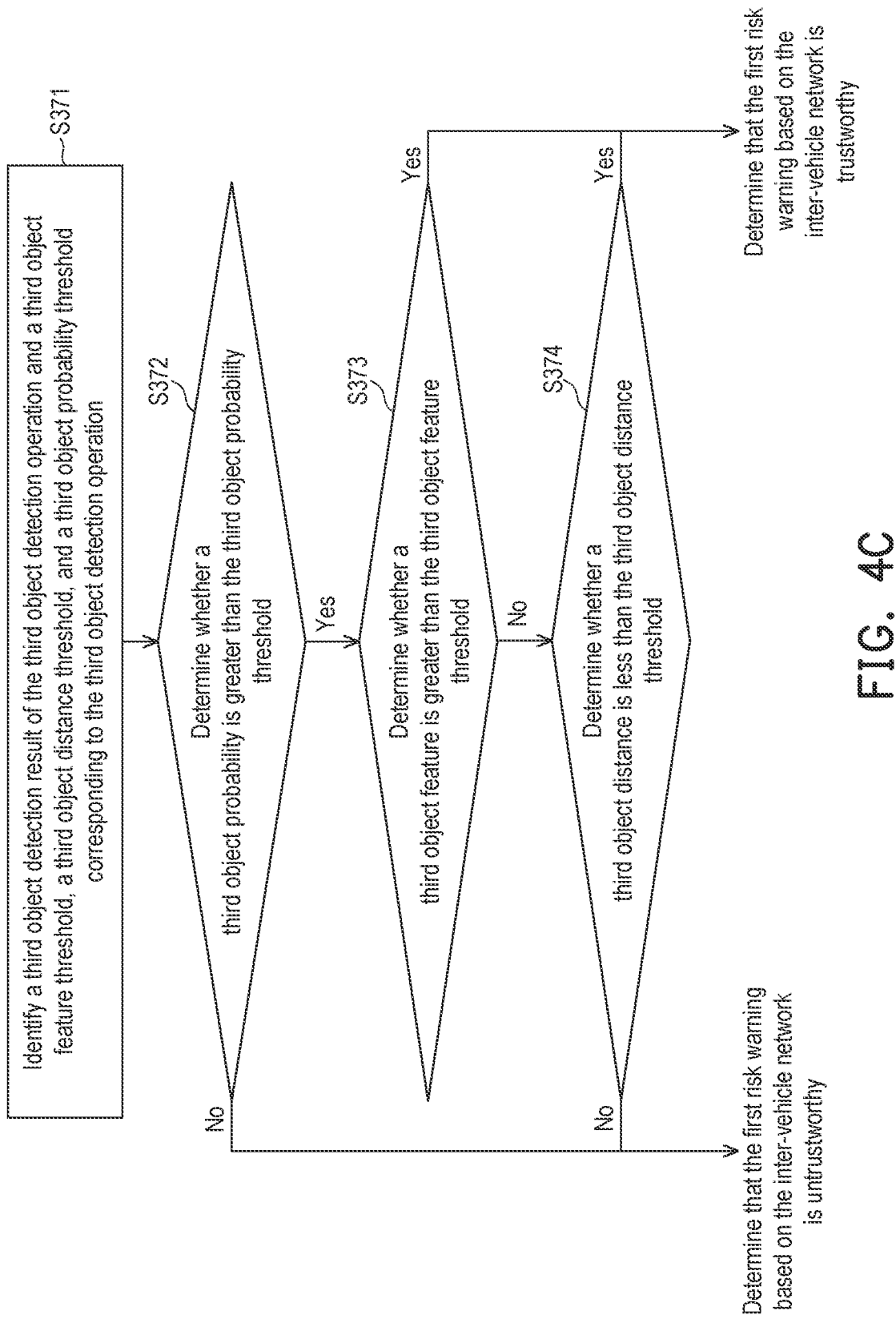
FIG. 4C is a flow chart of step S370 of FIG. 3 according to an embodiment of the disclosure.

On the other hand, referring to FIG. 4C, when the object detection operation is the third object detection operation based on mixed data, the step of determining whether the first risk warning WD1 based on the inter-vehicle network 400 is trustworthy according to the object detection result of the object detection operation and the plurality of predefined conditions corresponding to the object detection operation includes steps S371 to S374.

In step S371, the processor 110 identifies a third object detection result of the third object detection operation and a third object feature threshold, a third object distance threshold, and a third object probability threshold corresponding to the third object detection operation. The third object detection result includes a detected third object and a third object feature, a third object distance, and a third object probability corresponding to the detected third object. The third object feature threshold, the third object distance threshold, and the third object probability threshold are a plurality of third predefined conditions corresponding to the third object detection operation. Similar to the above methods of obtaining the first object feature threshold, the first object probability threshold, the second object distance threshold, and the second object probability threshold, the third object feature threshold, the third object distance threshold, and the third object probability threshold may be obtained through machine learning algorithm training or calculated through statistics.

Next, in step S372, the processor 110 determines whether the third object probability is greater than the third object probability threshold. In response to determining that the third object probability is greater than the third object probability threshold ("yes" is determined in S372), the processor 110 execute step S37. In response to determining that the third object probability is not greater than the third object probability threshold ("no" is determined in S372), the processor 110 determines that the first risk warning WD1 based on the inter-vehicle network 400 is untrustworthy.

Next, in step S373, the processor 110 determines whether the third object feature is greater than the third object feature threshold. In response to determining that the third object feature is greater than the third object feature threshold ("yes" is determined in S373), the processor 110 determines that the first risk warning WD1 based on the inter-vehicle network 400 is trustworthy. In response to determining that the third object feature is not greater than the third object feature threshold ("no" is determined in S373), the processor 110 executes step S374.

Next, in step S374, the processor 110 determines whether the third object distance is less than the third object distance threshold. In response to determining that the third object distance is less than the third object distance threshold ("yes" is determined in S374), the processor 110 determines that the first risk warning WD1 based on the inter-vehicle network 400 is trustworthy. In response to determining that the third object distance is not less than the third object distance threshold ("no" is determined in S374), the processor 110 determines that the first risk warning WD1 based on the inter-vehicle network 400 is untrustworthy.

It should be noted that in another embodiment, an execution order of steps S373 and S374 may be reversed. In addition, in this embodiment, the third object feature includes an image feature size or an image feature ratio of the detected third object, where the image feature ratio of the detected third object is a ratio of the image feature size of the detected third object to a predefined image size of the image data, where the third object probability is an existence probability of the detected third object.

In this embodiment, the detected first object, the detected second object, and the detected third object may also be referred to as a target first object, a target second object, and a target third object, which are, for example, objects that are most likely to cause a risk warning, such as a car in the front or a side car in a blind spot of view. In an embodiment, the detected first object, the detected second object, and the detected third object may also be objects closest to the vehicle.

Referring back to FIG. 3, in response to determining that the first risk warning WD1 based on the inter-vehicle network 400 is trustworthy, the processor 110 adjusts the driving behavior of the vehicle according to the first risk warning or the second risk warning (S380). In response to determining that the first risk warning WD1 based on the inter-vehicle network 400 is untrustworthy, the processor 110 ignores the first risk warning WD1 and does not adjust the driving behavior of the vehicle 10 according to the first risk warning WD1 (S390). In addition, the processor 110 may report the first risk warning WD1 (or false inter-vehicle data corresponding to the first risk warning WD1) to the certification authority (S400).

Figure 5A:
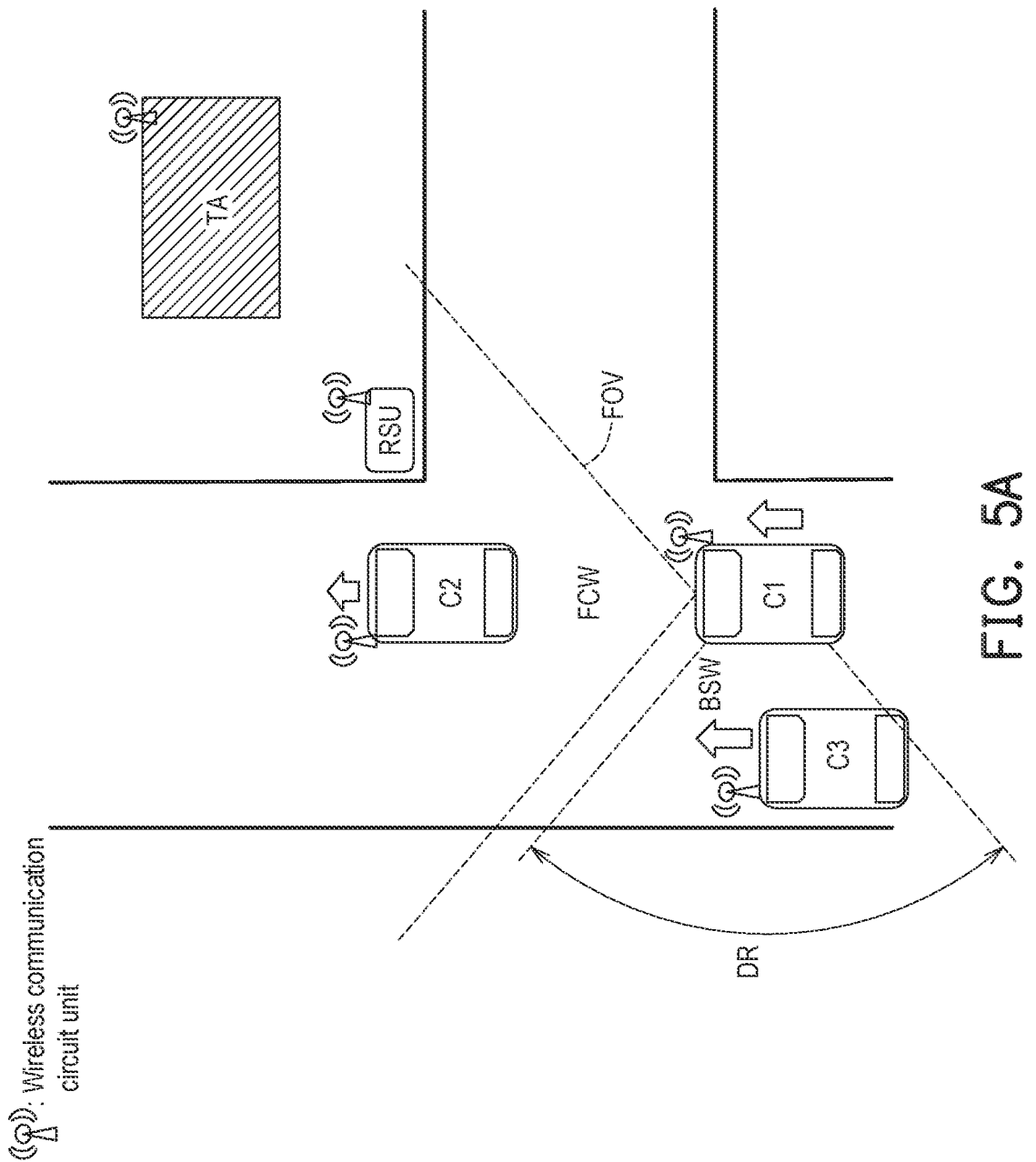
FIG. 5A is a schematic diagram of a plurality of electronic devices connected to an inter-vehicle network according to an embodiment of the disclosure.
Figure 5B:
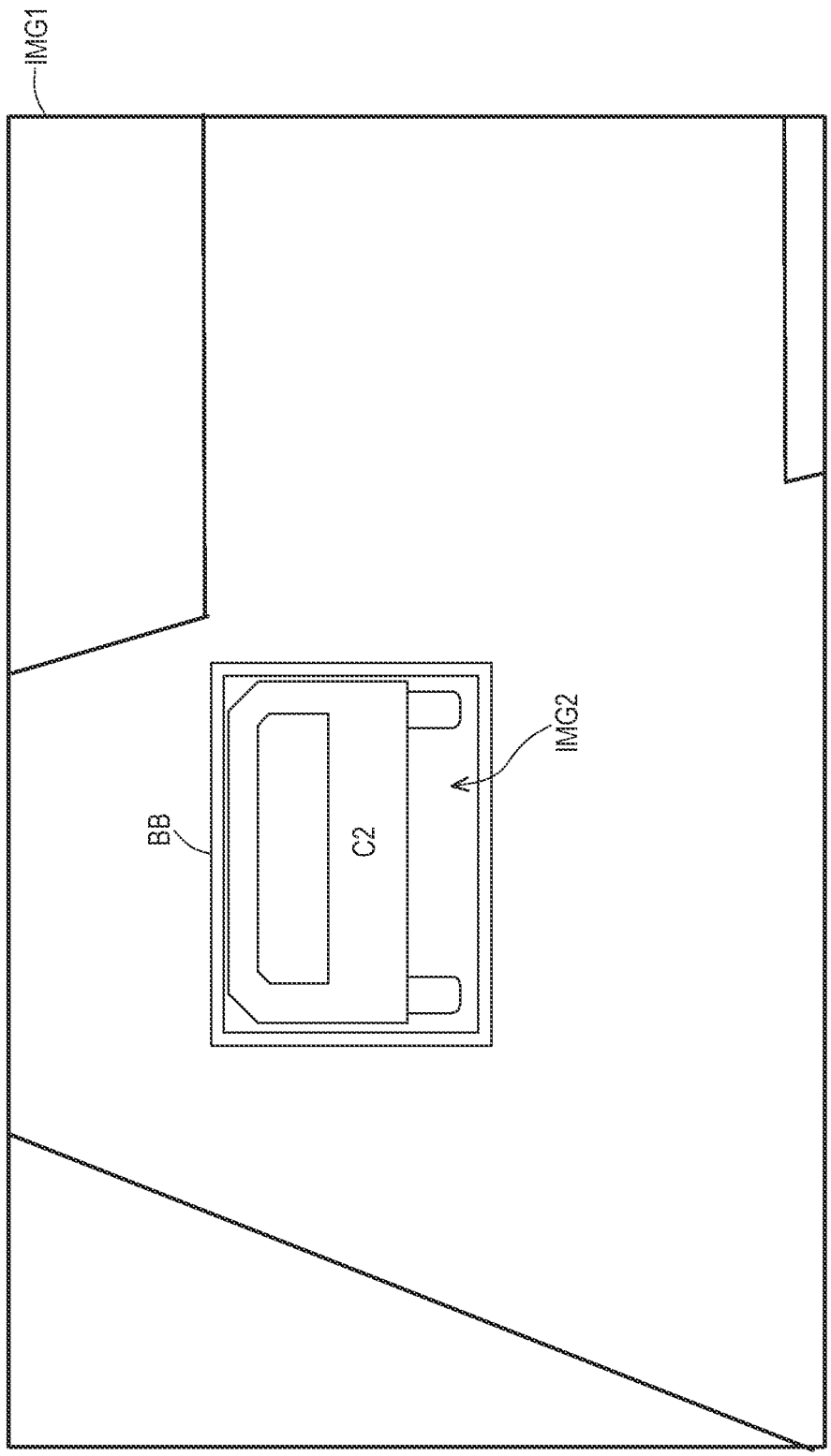
FIG. 5B is a schematic diagram of an image and an object detection result obtained by a vehicle-mounted electronic device according to an embodiment of the disclosure.

For instance, referring to FIG. 5A and FIG. 5B, the inter-vehicle network (e.g., VANET) includes three main entities, namely, vehicles OBU, a certification authority TA, and a roadside unit RSU. It is assumed that OBUs (i.e., on-board units) of vehicles C1 to C3, the certification authority TA, and the roadside unit RSU each has a wireless communication circuit unit to be connected to the inter-vehicle network. The certification authority TA is responsible for authorizing the roadside unit RSU and OBUs on the road. The communication between the OBUs and RSU includes vehicle-to-vehicle communication (V2V) and vehicle-to-infrastructure communication (V2I). False attacks may use security applications of V2V to send false inter-vehicle network data VD to the OBUs in the inter-vehicle network, so that the OBUs may generate false risk warnings.

In addition, it is assumed that the vehicle C1 is the vehicle 10, the object detection operation performed by the advanced driver assistance system 200 is the first object detection operation based on image data. A camera of the advanced driver assistance system 200 captures an image IMG1 through a field of view FOV. The advanced driver assistance system 200 may perform the first object detection operation on the image IMG1, identify the target first object C2, and use a bounding box BB to mark the target first object C2. In addition, the advanced driver assistance system 200 may determine the image feature size or image feature ratio corresponding to the target first object C2 through the bounding box BB or the image of the target first object C2. The image feature ratio of the target first object C2 is, for example, a ratio obtained by dividing a size of an image IMG2 covered by the bounding box BB by the size of the image IMG1. The target first object C2, the existence probability of the corresponding target first object C2 (i.e., a target first object probability), the image feature size or image feature ratio corresponding to the target first object C2 (i.e., a target first object feature), etc., may be packaged as an object detection result OD and sent to the vehicle-mounted electronic device 100 of the vehicle C1.

In the first example, it is assumed that the vehicle C1 has performed the first object detection operation and obtained a forward collision warning (the first risk warning WD1) based on the inter-vehicle network 400, which indicates that it is about to hit the vehicle C2 ahead (FCW). At the same time, the advanced driver assistance system 200 of the vehicle C1 sends the object detection result OD corresponding to the vehicle C2, and considers that the vehicle C2 does not meet initiation conditions of the forward collision warning of the advanced driver assistance system 200 (no second risk warning WD2 corresponding to the vehicle C2 is sent). Moreover, the advanced driver assistance system 200 of the vehicle C1 sends the object detection result OD corresponding to the vehicle C3, and considers that the vehicle C3 meets initiation conditions of the blind spot warning of the advanced driver assistance system 200. The advanced driver assistance system 200 senses a risk of the vehicle C3 located in the blind spot area through a detection range DR of BSW, and sends a blind spot warning (BSW) corresponding to the vehicle C3 (the second risk warning WD2 corresponding to the vehicle C3) to the vehicle-mounted electronic device 100 of the vehicle C1. Namely, the second risk warning sent by the advanced driver assistance system 200 of the vehicle C1 does not correspond to the first risk warning (because the second risk warning is BSW corresponding to the vehicle C3 and does not correspond to the FCW of the vehicle C2 warned by the first risk warning).

In this case ("no" is determined in S330 since the obtained second risk warning WD2 does not correspond to the first risk warning WD1), the vehicle C1 may further identify that the received object detection result OD is based on the first object detection operation of the image data (S340). At this time, the vehicle C1 may access a plurality of first predefined conditions corresponding to the first object detection operation, which include the first object feature threshold and the first object probability threshold.

Next, the vehicle C1 further determines whether the first risk warning corresponding to the vehicle C2 is trustworthy according to the first object detection result of the first object detection operation based on the image data (such as the image feature ratio of the target first object C2 and the existence probability of the target first object C2) and the corresponding first predefined conditions (such as the first object feature threshold and the first object probability threshold) (S350).

When the image feature ratio of the target first object C2 is not greater than the first object feature threshold or the existence probability of the target first object C2 is not greater than the first object probability threshold, the processor 110 determines that the first risk warning WD1 is untrustworthy, i.e., the first risk warning WD1 may be false. The processor 110 may ignore the first risk warning WD1 (S390). In addition, the processor 110 further reports the first risk warning WD1 to the certification authority (S400). For example, in an embodiment, the processor 110 further generates a false risk warning report, and sends the false risk warning report (e.g., including false inter-vehicle network data and/or the correspondingly generated false risk warning report) to the certification authority TA via the communication circuit unit 120 (S400), so that the certification authority TA records the false risk warning and/or the corresponding false inter-vehicle network data VD currently occurred in the inter-vehicle network 400, and the certification authority TA decide whether to blacklist or block this false risk warning/ or corresponding false inter-vehicle network data VD (and its corresponding entity/source). In the way, security of the overall inter-vehicle network may be better maintained.

On the contrary, when the image feature ratio of the target first object C2 is greater than the first object feature threshold and the existence probability of the target first object C2 is greater than the first object probability threshold, the processor 110 determines that the first risk warning WD1 is trustworthy, i.e., the first risk warning WD1 is not false. The processor 110 may adjust the driving behavior of the vehicle C1 according to the first risk warning WD1 (S380). For example, the processor 110 generates a corresponding control instruction CS according to the first risk warning WD1 and sends the same to the driving system 300 to adjust the driving behavior of the vehicle C1.

In the second example, it is assumed that the vehicle C1 has performed the first object detection operation and obtained a forward collision warning (the first risk warning WD1) based on the inter-vehicle network 400, which indicates that it is about to hit the vehicle C2 ahead (FCW). On the other hand, it is assumed that at the same time, the advanced driver assistance system 200 of the vehicle C1 sends the object detection result OD corresponding to the vehicle C2, and considers that the vehicle C2 meets initiation conditions of the forward collision warning of the advanced driver assistance system 200. The advanced driver assistance system 200 sends the forward collision warning (the second risk warning) corresponding to the vehicle C2 (FCW) to the vehicle-mounted electronic device 100 of the vehicle C1.

In this case ("yes" is determined in S330 since the obtained second risk warning WD2 corresponds to the first risk warning WD1), the processor 110 of the vehicle C1 determines that the first risk warning WD1 corresponding to the vehicle C2 is trustworthy. Then, the processor 110 adjusts the driving behavior of the vehicle C1 according to the first risk warning WD1 (S380). For example, the advanced driver assistance system 200 is notified that the first risk warning WD1 is trustworthy, so that the advanced driver assistance system 200 may generate and send the control instruction CS to the driving system 300 based on the second risk warning WD2 to adjust the driving behaviour of the vehicle C1.

In a third example, it is assumed that the vehicle C1 has performed the first object detection operation and obtained a forward collision warning (the first risk warning WD1) based on the inter-vehicle network 400, which indicates that it is about to hit the vehicle C2 ahead (FCW). On the other hand, it is assumed that at the same time, the advanced driver assistance system 200 of the vehicle C1 sends the object detection result OD corresponding to the vehicle C2, and considers that the vehicle C2 does not meet initiation conditions of the forward collision warning of the advanced driver assistance system 200. The advanced driver assistance system 200 does not send the forward collision warning (the second risk warning) corresponding to the vehicle C2 (FCW) to the vehicle-mounted electronic device 100 of the vehicle C1. Namely, the advanced driver assistance system 200 of the vehicle C1 does not send the second risk warning corresponding to the first risk warning to the processor 110 of the vehicle C1.

In this case ("no" is determined in S330 since the second risk warning WD2 corresponding to the first risk warning WD1 is not obtained), the vehicle C1 may further identify the received object detection result OD (S340). The subsequent operations are similar to the first example and will not be described here.

Based on the above descriptions, it is known that the method for identifying the false risk warning in the inter-vehicle network and the vehicle-mounted electronic device using the same have following advantages: (1) low computational load: the method for identifying the false risk warning in the inter-vehicle networks provided by the disclosure does not require additional computing operations at all times, and it may be determined that whether the first risk warning is a false risk warning by using the data provided by the advanced driver assistance system.

(2) Low latency and low power consumption: since there is no need to perform additional computing operations at all the time, latency and power consumption of the vehicle-mounted electronic device 100 may also be reduced.

(3) Higher reliability: since the method for identifying the false risk warning in the inter-vehicle network provided by the disclosure uses the existing data provided by the original advanced driver assistance system 200, it avoids reliability issues caused by specification matching.

Based on the above, the method for identifying the false risk warnings in the inter-vehicle network and the vehicle-mounted electronic device using the method provided by the present disclosure may determine whether the first risk warning is trustworthy based on the object detection operation, the first risk warning based on the inter-vehicle network, and the second risk warning based on the object detection operation. The method then identifies any false first risk warning, thereby avoiding incorrect driving behaviors caused by such false warnings and ensuring vehicle safety. In addition, since the first risk warning based on the inter-vehicle network is verified to be trustworthy only after obtaining the first risk warning, there is no need to continuously compare objects in all surrounding environments at all times in order to avoid risk warnings caused by false inter-vehicle data, which reduces the resource consumption of vehicle-mounted electronic device and thereby improving driving efficiency.

What is claimed is:

1. A method for identifying a false risk warning in an inter-vehicle network, adapted to a vehicle-mounted electronic device of a vehicle, wherein the vehicle-mounted electronic device comprises a processor and a communication circuit unit, wherein the vehicle-mounted electronic device is connected to the inter-vehicle network via the communication circuit unit, the method comprising:
   instructing an advanced driver assistance system of the vehicle to perform an object detection operation;
   in response to obtaining a first risk warning based on the inter-vehicle network, determining whether a second risk warning corresponding to the first risk warning based on the object detection operation is obtained or not, wherein the second risk warning is received from the advanced driver assistance system;
   in response to obtaining that the second risk warning corresponding to the first risk warning, determining that the first risk warning based on the inter-vehicle network is trustworthy or untrustworthy;
   in response to not obtaining that the second risk warning corresponding to the first risk warning, determining whether the first risk warning based on the inter-vehicle network is trustworthy or untrustworthy based on an object detection result of the object detection operation and a plurality of predefined conditions corresponding to the object detection operation;
   in response to determining that the first risk warning based on the inter-vehicle network is trustworthy, adjusting a driving behavior of the vehicle according to the first risk warning or the second risk warning; and in response to determining that the first risk warning based on the inter-vehicle network is untrustworthy, ignoring the first risk warning without adjusting the driving behavior of the vehicle according to the first risk warning.

2. The method of claim 1, wherein a type of the first risk warning or the second risk warning is
a forward collision warning (FCW) or a blind spot warning (BSW).

3. The method of claim 2, wherein determining whether the second risk warning corresponding to the first risk warning is obtained or not comprises the following steps:

determining whether the type of the first risk warning is the same as or different from the type of the received second risk warning;

in response to obtaining that the type of the first risk warning is different from the type of the received second risk warning, determining that the second risk warning corresponding to the first risk warning is not obtained;

in response to obtaining that the type of the first risk warning is the same as the type of the received second risk warning, determining whether a risk object of the first risk warning corresponds to a risk object of the second risk warning or not;

in response to determining that the risk object of the first risk warning corresponds to the risk object of the second risk warning, determining that the second risk warning corresponding to the first risk warning is obtained; and in response to determining that the risk object of the first risk warning does not correspond to the risk object of the second risk warning, determining that the second risk warning corresponding to the first risk warning is not obtained.

4. The method of claim 1, wherein the object detection operation comprises one or a plurality of following operations:
a first object detection operation based on image data;
a second object detection operation based on point cloud data; and
a third object detection operation based on mixed data, wherein the mixed data comprises the image data and the point cloud data.

5. The method of claim 4, wherein the step of determining whether the first risk warning based on the inter-vehicle network is trustworthy based on the object detection result of the object detection operation and the plurality of predefined conditions corresponding to the object detection operation comprises:

when the object detection operation is the first object detection operation based on the image data, identifying a first object detection result of the first object detection operation and a first object feature threshold and a first object probability threshold corresponding to the first object detection operation, wherein the first object detection result comprises a detected first object and a first object feature and a first object probability corresponding to the detected first object, wherein the first object feature threshold and the first object probability threshold are a plurality of first predefined conditions corresponding to the first object detection operation;

determining whether the first object feature is greater than the first object feature threshold or not;

determining whether the first object probability is greater than the first object probability threshold or not;

in response to determining that the first object feature is greater than the first object feature threshold and the first object probability is greater than the first object probability threshold, determining that the first risk warning based on the inter-vehicle network is trustworthy; and in response to determining that the first object feature is not greater than the first object feature threshold, or that the first object probability is not greater than the first object probability threshold, determining that the first risk warning based on the inter-vehicle network is untrustworthy.

6. The method of claim 5, wherein the first object feature comprises an image feature size or an image feature ratio of the detected first object, wherein the image feature ratio of the detected first object is a ratio of the image feature size of the detected first object to a predefined image size of the image data, wherein the first object probability is an existence probability of the detected first object.

7. The method of claim 4, wherein the step of determining whether the first risk warning based on the inter-vehicle network is trustworthy based on the object detection result of the object detection operation and the plurality of predefined conditions corresponding to the object detection operation comprises:

when the object detection operation is the second object detection operation based on the point cloud data, identifying a second object detection result of the second object detection operation and a second object distance threshold and a second object probability threshold corresponding to the second object detection operation, wherein the second object detection result comprises a detected second object and a second object distance and a second object probability corresponding to the detected second object, wherein the second object distance threshold and the second object probability threshold are a plurality of second predefined conditions corresponding to the second object detection operation;

determining whether the second object distance is less than the second object distance threshold or not;

determining whether the second object probability is greater than the second object probability threshold or not;

in response to determining that the second object distance is less than the second object distance threshold and the second object probability is greater than the second object probability threshold, determining that the first risk warning based on the inter-vehicle network is trustworthy; and in response to determining that the second object distance is not less than the second object distance threshold, or that the second object probability is not greater than the second object probability threshold, determining that the first risk warning based on the inter-vehicle network is untrustworthy.

8. The method of claim 7, wherein the second object distance is a distance between the detected second object and the vehicle, wherein the second object probability is an existence probability of the detected second object.

9. The method of claim 4, wherein the step of determining whether the first risk warning based on the inter-vehicle network is trustworthy based on the object detection result of the object detection operation and the plurality of predefined conditions corresponding to the object detection operation comprises:
    when the object detection operation is the third object detection operation based on the mixed data, identifying a third object detection result of the third object detection operation and a third object feature threshold, a third object distance threshold, and a third object probability threshold corresponding to the third object detection operation, wherein the third object detection result comprises a detected third object and a third object feature, a third object distance, and a third object probability corresponding to the detected third object, wherein the third object feature threshold, the third object distance threshold, and the third object probability threshold are a plurality of third predefined conditions corresponding to the third object detection operation;
    determining whether the third object probability is greater than the third object probability threshold or not;
    wherein in response to determining that the third object probability is not greater than the third object probability threshold, determining that the first risk warning based on the inter-vehicle network is untrustworthy,
    wherein in response to determining that the third object probability is greater than the third object probability threshold, determining whether the third object feature is greater than the third object feature threshold or not,
    wherein in response to determining that the third object feature is greater than the third object feature threshold, determining that the first risk warning based on the inter-vehicle network is trustworthy,
    wherein in response to determining that the third object feature is not greater than the third object feature threshold, determining whether the third object distance is less than the third object distance threshold or not,
    wherein in response to determining that the third object distance is less than the third object distance threshold, determining that the first risk warning based on the inter-vehicle network is trustworthy,
    wherein in response to determining that the third object distance is not less than the third object distance threshold, determining that the first risk warning based on the inter-vehicle network is untrustworthy.

10. The method of claim 9, wherein the third object feature comprises an image feature size or an image feature ratio of the detected third object, wherein the image feature ratio of the detected third object is a ratio of the image feature size of the detected third object to a predefined image size of the image data, wherein the third object probability is an existence probability of the detected third object.

11. A vehicle-mounted electronic device, adapted to a vehicle, comprising:
    a communication circuit unit connected to an inter-vehicle network;
    a processor coupled to the communication circuit unit; and
    a storage circuit unit storing a plurality of instructions, wherein when the plurality of instructions are executed by the processor, the vehicle-mounted electronic device is configured to execute the following steps:
    Performing an object detection operation by instructing an advanced driver assistance system of the vehicle;
    in response to obtaining a first risk warning based on the inter-vehicle network, determining whether a second risk warning corresponding to the first risk warning based on the object detection operation is obtained or not, wherein the second risk warning is received from the advanced driver assistance system;
    in response to obtaining that the second risk warning corresponding to the first risk warning, determine that the first risk warning based on the inter-vehicle network is trustworthy;
    in response to not obtaining that the second risk warning corresponding to the first risk warning, determining whether the first risk warning based on the inter-vehicle network is trustworthy based on an object detection result of the object detection operation and a plurality of predefined conditions corresponding to the object detection operation;
    in response to determining that the first risk warning based on the inter-vehicle network is trustworthy, adjusting a driving behavior of the vehicle according to the first risk warning or the second risk warning; and
    in response to determining that the first risk warning based on the inter-vehicle network is untrustworthy, ignoring the first risk warning without adjusting the driving behavior of the vehicle according to the first risk warning.

12. The vehicle-mounted electronic device according to claim 11, wherein a type of the first risk warning or the second risk warning is
    a forward collision warning (FCW) or a blind spot warning (BSW).

13. The vehicle-mounted electronic device according to claim 12, wherein determining whether the second risk warning corresponding to the first risk warning is obtained comprises the following steps:
    determining whether the type of the first risk warning is the same as or different from the type of the received second risk warning;
    in response to determining that the type of the first risk warning is different from the type of the received second risk warning, determining that the second risk warning corresponding to the first risk warning is not obtained;
    in response to determining that the type of the first risk warning is the same as the type of the received second risk warning, determining whether a risk object of the first risk warning corresponds to a risk object of the second risk warning;
    in response to determining that the risk object of the first risk warning corresponds to the risk object of the second risk warning, determining that the second risk warning corresponding to the first risk warning is obtained; and
    in response to determining that the risk object of the first risk warning does not correspond to the risk object of the second risk warning, determining that the second risk warning corresponding to the first risk warning is not obtained.

14. The vehicle-mounted electronic device according to claim 11, wherein the object detection operation comprises one or a plurality of following operations:
    a first object detection operation based on image data;
    a second object detection operation based on point cloud data; and
    a third object detection operation based on mixed data, wherein the mixed data comprises the image data and the point cloud data.

15. The vehicle-mounted electronic device according to claim 14, wherein the step of determining whether the first risk warning based on the inter-vehicle network is trustworthy based on the object detection result of the object detection operation and the plurality of predefined conditions corresponding to the object detection operation comprises:

when the object detection operation is the first object detection operation based on the image data, identifying a first object detection result of the first object detection operation and a first object feature threshold and a first object probability threshold corresponding to the first object detection operation, wherein the first object detection result comprises a detected first object and a first object feature and a first object probability corresponding to the detected first object, wherein the first object feature threshold and the first object probability threshold are a plurality of first predefined conditions corresponding to the first object detection operation;

determining whether the first object feature is greater than the first object feature threshold or not;

determining whether the first object probability is greater than the first object probability threshold or not;

in response to determining that the first object feature is greater than the first object feature threshold and the first object probability is greater than the first object probability threshold, determining that the first risk warning based on the inter-vehicle network is trustworthy; and in response to determining that the first object feature is not greater than the first object feature threshold or that the first object probability is not greater than the first object probability threshold, determining that the first risk warning based on the inter-vehicle network is untrustworthy.

16. The vehicle-mounted electronic device according to claim 15, wherein the first object feature comprises an image feature size or an image feature ratio of the detected first object, wherein the image feature ratio of the detected first object is a ratio of the image feature size of the detected first object to a predefined image size of the image data, wherein the first object probability is an existence probability of the detected first object.

17. The vehicle-mounted electronic device according to claim 14, wherein the step of determining whether the first risk warning based on the inter-vehicle network is trustworthy based on the object detection result of the object detection operation and the plurality of predefined conditions corresponding to the object detection operation comprises:

when the object detection operation is the second object detection operation based on the point cloud data, identifying a second object detection result of the second object detection operation and a second object distance threshold and a second object probability threshold corresponding to the second object detection operation, wherein the second object detection result comprises a detected second object and a second object distance and a second object probability corresponding to the detected second object, wherein the second object distance threshold and the second object probability threshold are a plurality of second predefined conditions corresponding to the second object detection operation;

determining whether the second object distance is less than the second object distance threshold or not;

determining whether the second object probability is greater than the second object probability threshold or not;

in response to determining that the second object distance is less than the second object distance threshold and the second object probability is greater than the second object probability threshold, determining that the first risk warning based on the inter-vehicle network is trustworthy; and in response to determining that the second object distance is not less than the second object distance threshold or that the second object probability is not greater than the second object probability threshold, determining that the first risk warning based on the inter-vehicle network is untrustworthy.

18. The vehicle-mounted electronic device according to claim 17, wherein the second object distance is a distance between the detected second object and the vehicle, wherein the second object probability is an existence probability of the detected second object.

19. The vehicle-mounted electronic device according to claim 14, wherein the step of determining whether the first risk warning based on the inter-vehicle network is trustworthy based on the object detection result of the object detection operation and the plurality of predefined conditions corresponding to the object detection operation comprises:

when the object detection operation is the third object detection operation based on the mixed data, identifying a third object detection result of the third object detection operation and a third object feature threshold, a third object distance threshold, and a third object probability threshold corresponding to the third object detection operation, wherein the third object detection result comprises a detected third object and a third object feature, a third object distance, and a third object probability corresponding to the detected third object, wherein the third object feature threshold, the third object distance threshold, and the third object probability threshold are a plurality of third predefined conditions corresponding to the third object detection operation;

determining whether the third object probability is greater than the third object probability threshold or not;

wherein in response to determining that the third object probability is not greater than the third object probability threshold, determining that the first risk warning based on the inter-vehicle network is untrustworthy, wherein in response to determining that the third object probability is greater than the third object probability threshold, determining whether the third object feature is greater than the third object feature threshold or not, wherein in response to determining that the third object feature is greater than the third object feature threshold, determining that the first risk warning based on the inter-vehicle network is trustworthy, wherein in response to determining that the third object feature is not greater than the third object feature threshold, determining whether the third object distance is less than the third object distance threshold or not, wherein in response to determining that the third object distance is less than the third object distance threshold, determining that the first risk warning based on the inter-vehicle network is trustworthy, wherein in response to determining that the third object distance is not less than the third object distance threshold, determining that the first risk warning based on the inter-vehicle network is untrustworthy.

20. The vehicle-mounted electronic device according to claim 19, wherein the third object feature comprises an image feature size or an image feature ratio of the detected third object, wherein the image feature ratio of the detected third object is a ratio of the image feature size of the detected third object to a predefined image size of the image data, wherein the third object probability is an existence probability of the detected third object.

* * * * *